(12) United States Patent
Berry et al.

(10) Patent No.: US 11,799,640 B2
(45) Date of Patent: *Oct. 24, 2023

(54) SYSTEMS AND METHODS FOR BIFURCATED BLOCKCHAIN-BASED DIGITAL ENCRYPTION

(71) Applicant: Bank of America Corporation, Charlotte, NC (US)

(72) Inventors: Anna Kristen Pingel Berry, Indian Land, SC (US); Benjamin Daniel Hardman, Harrisburg, NC (US)

(73) Assignee: Bank of America Corporation, Charlotte, NC (US)

( * ) Notice: Subject to any disclaimer, the term of this patent is extended or adjusted under 35 U.S.C. 154(b) by 292 days.

This patent is subject to a terminal disclaimer.

(21) Appl. No.: 17/458,647

(22) Filed: Aug. 27, 2021

(65) Prior Publication Data

US 2023/0065507 A1    Mar. 2, 2023

(51) Int. Cl.
| | | |
|---|---|---|
| *H04L 9/08* | (2006.01) | |
| *H04L 9/32* | (2006.01) | |
| *G06Q 50/00* | (2012.01) | |
| *G06Q 50/18* | (2012.01) | |
| *H04L 9/00* | (2022.01) | |

(52) U.S. Cl.
CPC ........... *H04L 9/0863* (2013.01); *G06Q 50/01* (2013.01); *G06Q 50/18* (2013.01); *H04L 9/0891* (2013.01); *H04L 9/0894* (2013.01); *H04L 9/3226* (2013.01); *H04L 9/50* (2022.05)

(58) Field of Classification Search
CPC ... H04L 9/0863; H04L 9/0894; H04L 9/0891; H04L 9/3226; G06Q 50/01; G06Q 50/18

USPC .......................................................... 713/184
See application file for complete search history.

(56) References Cited

U.S. PATENT DOCUMENTS

| | | | |
|---|---|---|---|
| 10,749,681 B2 * | 8/2020 | Andrade | ............... H04L 9/0866 |
| 11,176,282 B2 * | 11/2021 | Murdoch | .............. H04L 9/0866 |
| 2006/0156385 A1 * | 7/2006 | Chiviendacz | ......... H04L 9/3271 |
| | | | 726/2 |
| 2019/0305965 A1 | 10/2019 | Hamel et al. | |
| 2019/0340352 A1 | 11/2019 | Peeters et al. | |
| 2020/0057848 A1 * | 2/2020 | Hecht | ................. H04L 63/1425 |
| 2020/0084018 A1 | 3/2020 | Pande et al. | |
| 2020/0112557 A1 | 4/2020 | McCullough, IV et al. | |
| 2020/0186358 A1 | 6/2020 | Capola et al. | |
| 2020/0226242 A1 | 7/2020 | Balaraman et al. | |

(Continued)

*Primary Examiner* — Dereena T Cattungal
(74) *Attorney, Agent, or Firm* — Weiss & Arons LLP

(57) ABSTRACT

Systems and methods for digitally encrypting sensitive, self-executing, digital content are provided. A method may include storing the digital content in an encrypted digital vault and generating a first password and a second password which together may unlock the digital vault. The method may include storing the first password on a first encrypted distributed ledger and the second password on a second encrypted distributed ledger. The method may include automatically updating the passwords periodically and storing the updated passwords as new entries on the distributed ledgers. When a document from a predetermined list of documents is digitally scanned and authenticated, the method may include unlocking access to the first password on the first distributed ledger for the designated entity. When the digital vault is unlocked with the first and the second passwords, the digital content may self-execute.

14 Claims, 4 Drawing Sheets

(56) References Cited

U.S. PATENT DOCUMENTS

| | | | | |
|---|---|---|---|---|
| 2020/0267137 A1* | 8/2020 | Sambhar | .................. | H04L 63/20 |
| 2021/0327008 A1* | 10/2021 | Salah | ......................... | G06F 8/38 |
| 2022/0216990 A1* | 7/2022 | Mukherjee | ......... | G06Q 20/3821 |
| 2022/0292216 A1* | 9/2022 | Devitt | ...................... | G06F 21/31 |
| 2023/0034169 A1* | 2/2023 | Ferenczi | ............... | H04L 9/3271 |

* cited by examiner

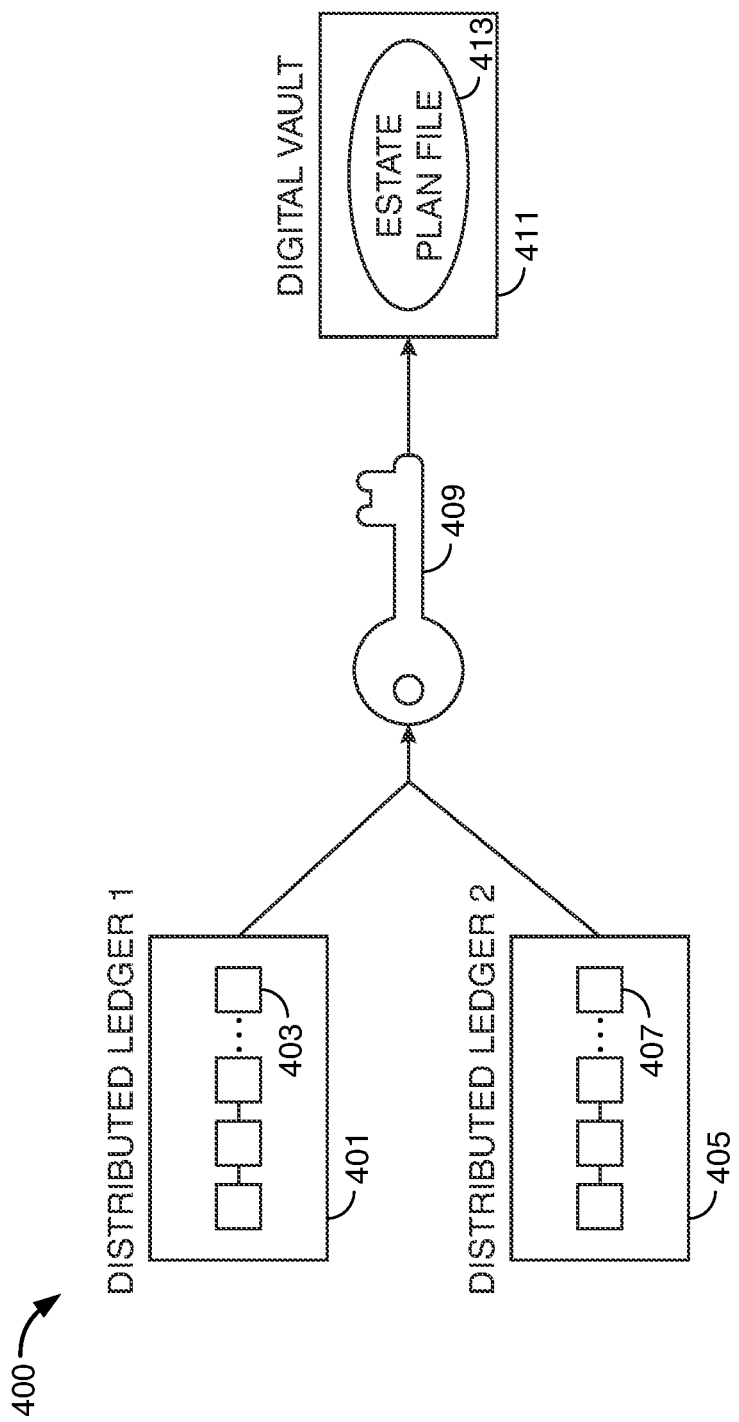

SYSTEMS AND METHODS FOR BIFURCATED BLOCKCHAIN-BASED DIGITAL ENCRYPTION

FIELD OF TECHNOLOGY

Aspects of the disclosure relate to digital systems. Specifically, aspects of the disclosure relate to blockchain-based digital encryption systems.

BACKGROUND OF THE DISCLOSURE

It is common for individuals, during their lifetimes, to plan for when they will no longer be alive. Such plans often involve estate plans, such as the transfer of assets to a designated heir or heirs. Plans may also include social media plans, which may dictate the status of a particular social media account or set of accounts. For example, an account may be shut down, deleted, transferred, archived, or subject to other suitable action.

Such plans are often stored digitally. However, conventional digital estate plans face many deficiencies. They often lack robust security. Even when sufficiently encrypted, it is often difficult to ensure that the passwords are accessible to the necessary entities at precisely the correct time. For example, it may be desirable for an heir to have access to the estate plan as soon as possible after the death of the benefactor, but not before.

Accordingly, it would be desirable to provide systems and methods for digital encryption of sensitive digital content. It would be further desirable for the systems and methods to include an architecture that provides robust security and precise, timely, password propagation.

SUMMARY OF THE DISCLOSURE

Aspects of the disclosure relate to digital encryption systems. A bifurcated digital encryption system is provided. The system may include a first distributed ledger, a second distributed ledger, and an encrypted digital vault storing sensitive, self-executing, digital content. The system may also include a processor, a non-transitory memory, and computer executable instructions stored in the memory, that, when run on the processor, are configured to perform some or all the features of the system.

The system may generate a first password and a second password. The first password and the second password together may unlock the digital vault. The system may store the first password on the first distributed ledger and the second password on the second distributed ledger. The system may automatically update the first password periodically and store the updated first password as a new entry on the first distributed ledger. The system may automatically update the second password periodically and store the updated second password as a new entry on the second distributed ledger.

Access to the first password on the first distributed ledger may be locked to any entity that is not authenticated as the account holder. Access to the second password on the second distributed ledger may be locked to any entity that is not authenticated as the designated entity. When a document from a predetermined list of documents is digitally scanned and authenticated, access to the first password on the first distributed ledger may be unlocked for the designated entity. When the digital vault is unlocked with the first and the second passwords, the digital content may self-execute.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 4 shows an illustrative system architecture in accordance with principles of the disclosure.

DETAILED DESCRIPTION OF THE DISCLOSURE

Figure 1:
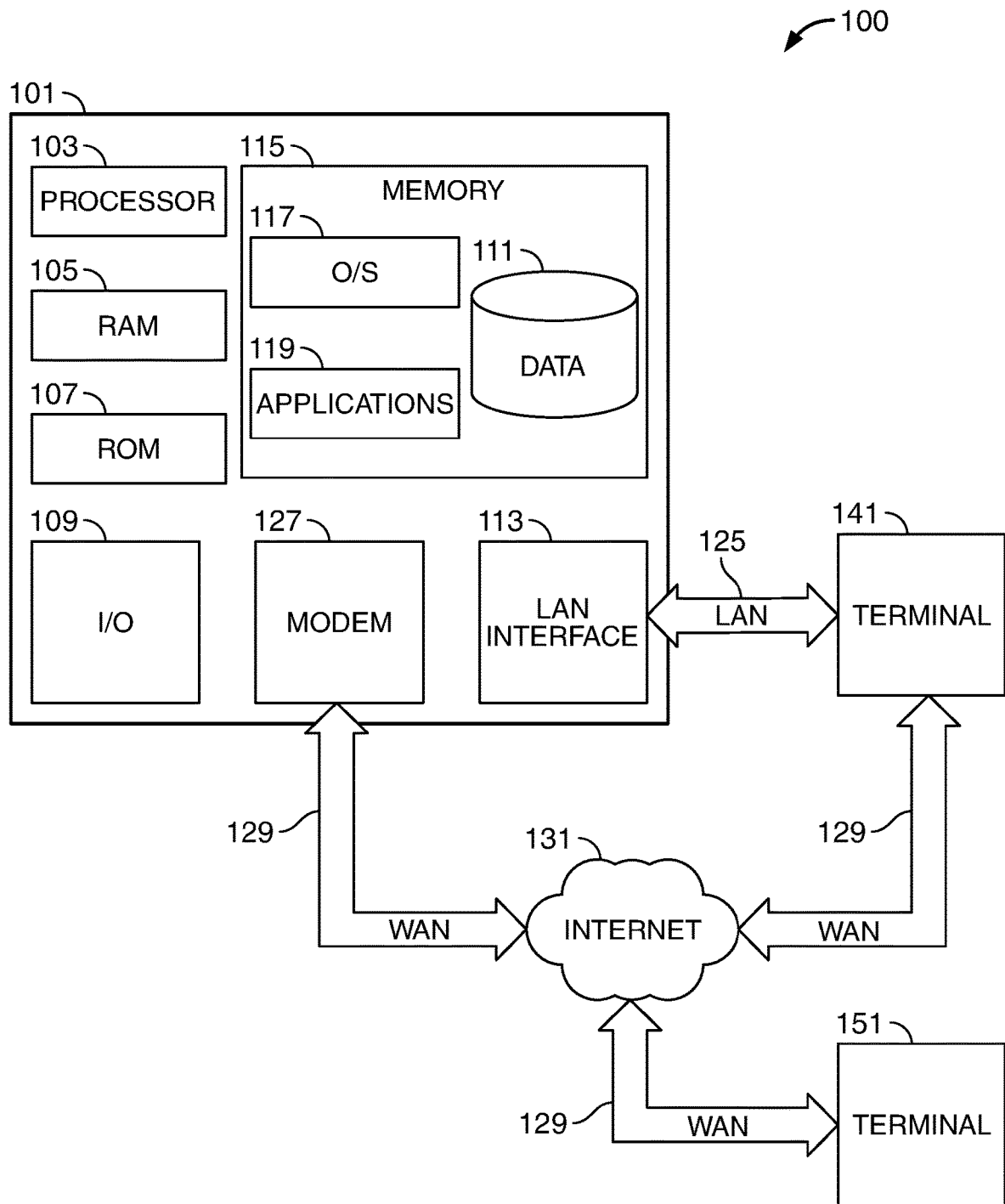
FIG. 1 shows an illustrative system in accordance with principles of the disclosure.

Aspects of the disclosure relate to systems and methods for digital encryption. Systems may include a processor, a non-transitory memory, and computer executable instructions stored in the memory. The computer executable instructions, when run on the processor, may be configured to perform some or all the features of the system. The system may, in some embodiments, be wholly or partially cloud based.

A bifurcated digital encryption system is provided. The system may include a first distributed ledger and a second distributed ledger. A distributed ledger may include a plurality of coordinated databases. Coordinating the databases may, for example, include syncing the databases based on a consensus. Each coordinated database may be stored on a distinct node from a plurality of nodes. Each coordinated database may include linked blocks of hashed data. A block that is linked to a previous block may include a hashing of the hashed data of the previous block. In certain embodiments, the data may be encrypted. In other embodiments, the data may not be hashed or encrypted. The link between the blocks may include a pointer.

Each one of the databases of the distributed ledger may be stored on a distinct one of a plurality of nodes. When the distributed ledger is initialized or updated, a data block containing data associated with the initialization/update may be created on each of the nodes. The data block may be linked to the most recent pre-update data block.

One example of a distributed ledger is a blockchain. A blockchain is a distributed database of records or public ledger of all transactions or digital events that have been executed and shared among participants. Each transaction or digital event in the public ledger is verified by a majority of participants included in the system. Once a transaction or digital event is executed, it can never be erased. The blockchain therefore contains an immutable and verifiable record of each transaction or event. An encrypted blockchain also provides a secure and anonymous architecture for storing sensitive information.

A distributed electronic ledger may store records in any suitable format. For example, records may be stored sequentially as they are generated, one after the other in a continuous ledger. Records may be stored in blocks, such as in a blockchain.

Records stored in a distributed electronic ledger may only be added to the ledger when the participants responsible for maintaining the distributed ledger (e.g., participant devices or nodes) reach a consensus. The distributed ledger may use any suitable consensus algorithm such as Proof of Work, Proof of Stake or Practical Byzantine Fault Tolerance.

The distributed ledger may be a public or unpermissioned distributed ledger. A public distributed ledger does not have restrictions on who may participate in establishing a consensus for adding a new record.

The distributed ledger may be a private or permissioned distributed ledger. A private distributed ledger has restrictions on who may participate in establishing a consensus for adding a new record.

The distributed ledger may utilize a combination of private and public participation in establishing a consensus. For example, the distributed ledger may require a threshold number of private and/or public votes before recording a transaction on the distributed ledger. Utilization of private entities may allow for achieving a consensus (or rejection) of a transaction faster than wholly public distributed ledgers.

The distributed ledger may be a blockchain. Records stored in a blockchain are organized in blocks. Each block may include multiple records. The blocks are linked to one another and secured using cryptography.

The distributed ledger may include a blockchain of electronic data records. Each record may be authenticated by a consensus protocol. A complete copy of the blockchain may be stored on multiple computer systems. Each computer system that stores a copy of the blockchain may be a "node."

Groups of authenticated transactions may be gathered into "blocks." A node may add a "block" to the blockchain. Each block may include data and metadata. Metadata may include a reference to the previous block in the chain and a unique identifier associated with the previous block. The unique identifier may be an output of a hash function.

The system may also include an encrypted digital vault storing sensitive, self-executing, digital content. Self-executing digital content may be programmed to perform certain pre-determined actions in response to a trigger. The trigger may, in certain embodiments, be an event. The trigger may, in some embodiments, be successful entry of a password or set of passwords. In some embodiments, the digital vault may be a third distributed ledger.

The system may generate a first password and a second password. The first password and the second password together may unlock the digital vault. Certain embodiments may be configured to generate a single combined password and bifurcate the combined password to generate the first and the second password. The system may store the first password on the first distributed ledger and the second password on the second distributed ledger.

The system may automatically update the first password. The automatic update may be performed periodically (e.g., every year, month, week, day, hour, minute, second, or substantially continuously). The automatic update may be performed at random intervals. The updated password may be generated randomly. The system may store the updated first password as a new entry on the first distributed ledger. The system may automatically update the second password periodically and store the updated second password as a new entry on the second distributed ledger.

Access to the first password on the first distributed ledger may be locked to any entity that is not authenticated as the account holder. For example, the first distributed ledger may be password protected and the account holder may be provided the password. In other embodiments, the first distributed ledger may be locked and only accessible from a device associated with the account holder. In still other embodiments, the first distributed ledger may be locked and only accessible upon biometric verification that the accessor is the account holder, e.g., via voice recognition, fingerprint scan, retina scan, or other suitable biometric verification. Similarly, access to the second password on the second distributed ledger may be locked to any entity that is not authenticated as the designated entity.

The designated entity may, in certain embodiments, include a trustee or an entity with power of attorney from the account holder. In some embodiments, the designated entity may be an heir to the account holder.

When a document from a predetermined list of documents is digitally scanned and authenticated, access to the first password on the first distributed ledger may be unlocked for the designated entity. The predetermined list of documents may, in some embodiments, include documents that indicate death of the account holder. For example, one document of the predetermined list of documents may be a death certificate.

In certain embodiments, the predetermined list of documents may include a document that records approval of the account holder to unlock access to the first password on the first distributed ledger for the designated entity.

When the digital vault is unlocked with the first and the second passwords, the digital content may self-execute. Self-execution of the digital content may include executing an asset transfer, executing a transfer of authority of a social media account, or any other suitable action or transaction that may be incorporated in the digital content. The system may, in certain embodiments, use a ML engine for the self-execution.

The digital content may, in some embodiments, include an estate plan. In certain embodiments, the estate plan may include a transfer of assets. In some embodiments, the estate plan may include a change of authority for a social media account.

The digital content may, in some embodiments, be a smart contract. A smart contract may include machine executable instructions running on a computing system. The executable instructions may be self-executing and trigger actions at specified times and/or based on reference to the occurrence or non-occurrence of a target action or event. Some or all of the computer executable instructions may be embodied in hardware or firmware components of a computing system.

A smart contract may be run in cloud computing and virtualization implementations of software. Such implementations may be designed to run on a physical apparatus supplied externally by a hosting provider, a client, or other virtualized platform. A smart contract may include computer executable instructions for invoking user functionality related to communication, such as email, short message service ("SMS"), and voice input and speech recognition applications.

Smart contracts may utilize computer-executable instructions, such as program modules, executed by a processor on the computing system. Generally, program modules include routines, programs, objects, components, data structures, etc. that perform particular tasks or implement particular abstract data types. Smart contracts may be operational with distributed computing environments where tasks are performed by remote processing devices that are linked through a communications network. In a distributed computing environment, program modules may be located in both local and remote computer storage media including memory storage devices. Smart contracts may rely on a network of remote servers hosted on the Internet to store, manage, and process data (e.g., "cloud computing" and/or "fog computing"). For example, smart contracts may be run on nodes that form a blockchain environment.

Smart contracts may be computer programs that can automatically execute the terms of a contract. A smart contract may be made between two or more participating entities. When a preconfigured condition in a smart contract is met, payments or other digital actions between the parties involved in the contractual agreement may be executed, as per the contract, in a reliable manner.

A method for digitally encrypting sensitive, self-executing, digital content is provided. The method may include storing the digital content in an encrypted digital vault. The method may include generating a first password and a second password. The first password and the second password together may unlock the digital vault. The method may include storing the first password on a first distributed ledger and the second password on a second distributed ledger. The method may include locking access to the first password on the first distributed ledger to any entity that is not authenticated as the account holder. The method may include locking access to the second password on the second distributed ledger to any entity that is not authenticated as the designated entity.

The method may include automatically updating the first password periodically and storing the updated first password as a new entry on the first distributed ledger. The method may include automatically updating the second password periodically and storing the updated second password as a new entry on the second distributed ledger. When a document from a predetermined list of documents is digitally scanned and authenticated, the method may include unlocking access to the first password on the first distributed ledger for the designated entity. When the digital vault is unlocked with the first and the second passwords, the method may include executing the digital content.

A blockchain-based dual-password encryption system for a smart contract is provided. The system may include a first blockchain storing a first password. The first blockchain may be access restricted and an account holder may be granted access. The system may include a second blockchain storing a second password. The second blockchain may be access restricted and a designated entity may be granted access. The system may include a third blockchain storing the smart contract. The third blockchain may be access restricted and access may only be granted upon digital entry of the both the first password and the second password.

The first password may be automatically updated periodically. The updated first password may be stored as a new entry on the first distributed ledger. The second password may be automatically updated periodically. The updated second password may be stored as a new entry on the second distributed ledger.

When a document from a predetermined list of documents is digitally scanned and authenticated, access to the first password on the first distributed ledger may be unlocked for the designated entity. When the digital vault is unlocked with the first and the second passwords, the smart contract may self-execute.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to password and security settings. The input/output module may also include one or more speakers for providing audio output and a video display device for providing textual, audio, audiovisual, and/or graphical output. The input and output may be related to computer application functionality. The input and output may be related to password and security settings.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to password and security settings.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
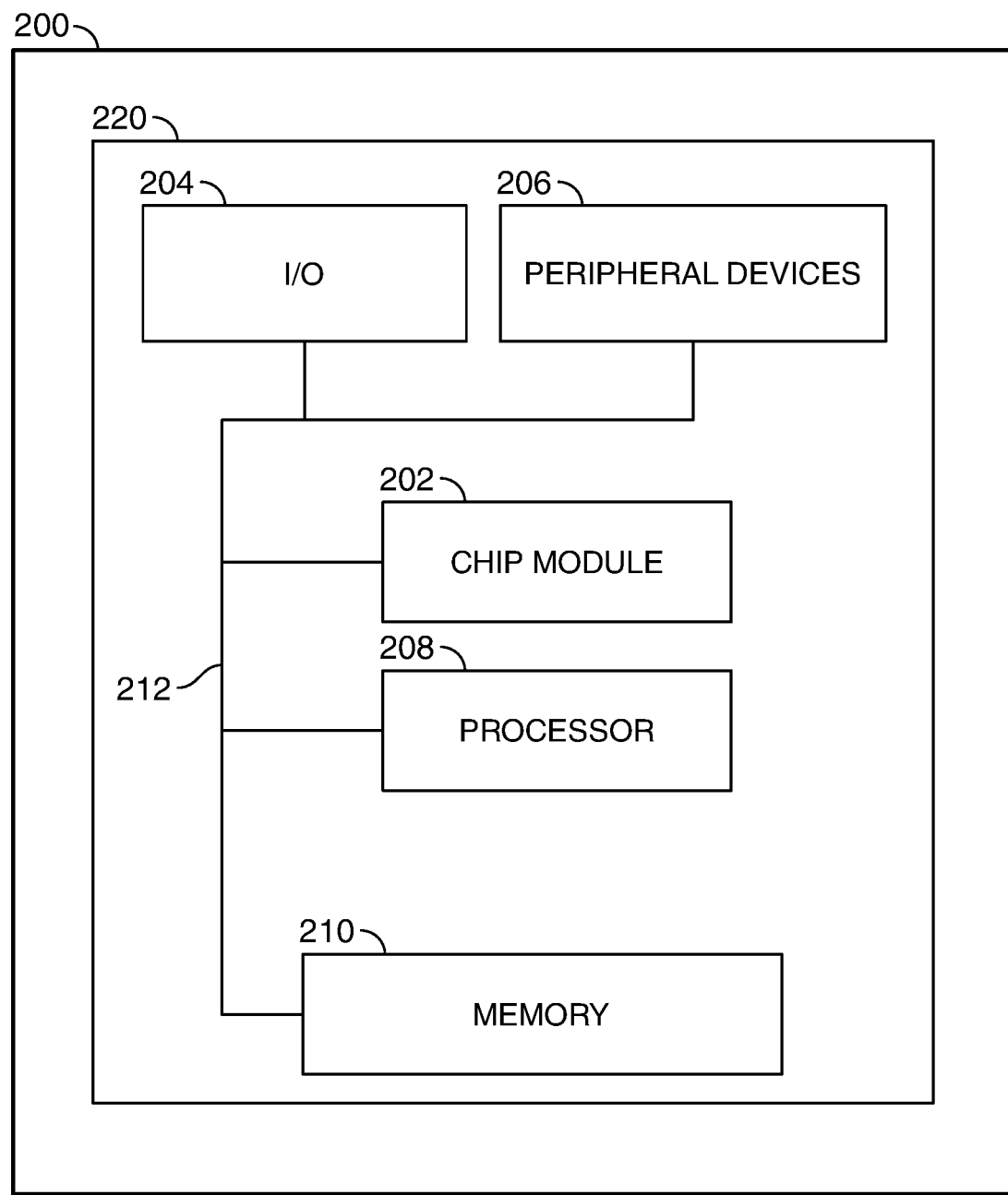
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
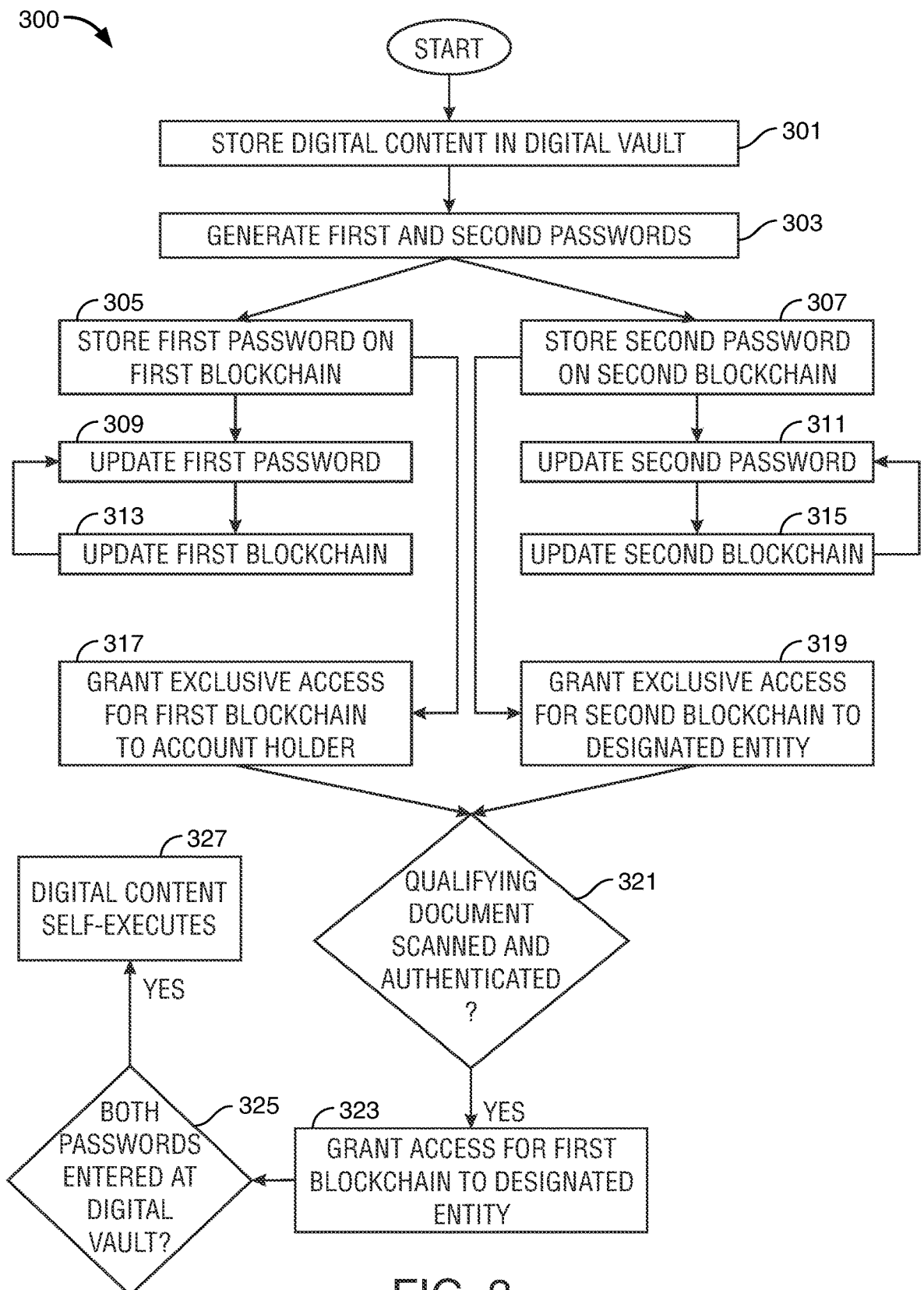
FIG. 3 shows an illustrative flowchart in accordance with principles of the disclosure.

FIG. 3 shows illustrative flowchart 300 in accordance with principles of the disclosure. Flowchart 300 begins at step 301 with storing digital content in a digital vault. At step 303 a first and a second password are generated. The first password may be stored on a first blockchain at step 305. The first password may be periodically updated at step 309, and the first blockchain may updated accordingly at step 313. The second password may be stored on a second blockchain at step 307. The second password may be periodically updated at step 311, and the second blockchain may updated accordingly at step 315.

Exclusive access may be granted to the account holder for the first password on the first blockchain at step 317. Exclusive access may be granted to the designated entity for the second password on the second blockchain at step 319. At step 321, the process may query if a qualifying document was scanned and authenticated. If a qualifying document was scanned and authenticated, the process may proceed to step 323 and grant access for the first password on the first blockchain to the designated entity. If both passwords register as being entered at the digital vault at step 325, the digital content may self-execute at step 327.

FIG. 4 shows illustrative system architecture 400 in accordance with principles of the disclosure. Architecture 400 includes distributed ledger 1 (401) and distributed ledger 2 (405). Distributed ledger 1 (401) includes a chain of ledgers with most recent ledger 403 at the end. Distributed ledger 2 (405) includes a chain of ledgers with most recent ledger 407 at the end. Ledgers 403 and 407 may represent the most updated versions of a first and second password, respectively. The first and second passwords may, in combination, act as a digital key 409 to unlock digital vault 411. Unlocking digital vault 411 may trigger self-execution of an estate plan file 413 contained in digital vault 411. Digital vault 411 may be a third distributed ledger. Estate plan file 413 may be a smart contract.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for bifurcated blockchain-based digital encryption are provided. Persons skilled in the art will appreciate that the present invention can be practiced by other than the described embodiments, which are presented for purposes of illustration rather than of limitation, and that the present invention is limited only by the claims that follow.

What is claimed is:

1. A bifurcated digital encryption system, the system comprising:
    a first distributed ledger and a second distributed ledger;
    an encrypted digital vault storing sensitive, self-executing, digital content;
    a processor;
    a non-transitory memory; and
    computer executable instructions stored in the memory, that, when run on the processor, are configured to:
        generate a first password and a second password, wherein the first password and the second password together unlock the digital vault;
        store the first password on the first distributed ledger and the second password on the second distributed ledger;
        automatically update the first password periodically and store the updated first password as a new entry on the first distributed ledger; and
        automatically update the second password periodically and store the updated second password as a new entry on the second distributed ledger;
    wherein:
    access to the first password on the first distributed ledger is locked to any entity that is not authenticated as the account holder;
    access to the second password on the second distributed ledger is locked to any entity that is not authenticated as the designated entity;
    when a document from a predetermined list of documents is digitally scanned and authenticated, exclusive access to the first password on the first distributed ledger is unlocked for the designated entity;
    when a second document from a second predetermined list of documents is digitally scanned and authenticated, exclusive access to the second password on the second distributed ledger is unlocked for the designated entity;
    wherein the first and second passwords are reunited as a digital key to unlock the digital vault;
    when the digital vault is unlocked with the first and the second passwords, the digital content self-executes as the digital key via a machine learning (ML) engine;
    wherein the digital content comprises an estate plan; and
    wherein the estate plan comprises a change of authority for a social media account.

2. The system of claim 1 wherein the digital vault is a third distributed ledger.

3. The system of claim 1 further configured to generate a single combined password and bifurcate the combined password to generate the first and the second password.

4. The system of claim 1 wherein the digital content is a smart contract.

5. The system of claim 1 wherein the designated entity is an entity with power of attorney from the account holder.

6. The system of claim 1 wherein the designated entity is an heir to the account holder.

7. The system of claim 1 wherein the predetermined list of documents comprises documents that indicate death of the account holder, and one document of the predetermined list of documents is a death certificate.

8. The system of claim 1 wherein the predetermined list of documents comprises a document that records approval of the account holder to unlock access to the first password on the first distributed ledger for the designated entity.

9. A method for digitally encrypting sensitive, self-executing, digital content, the method comprising:
    storing the digital content in an encrypted digital vault;
    generating a first password and a second password, wherein the first password and the second password together unlock the digital vault;
    storing the first password on a first distributed ledger and the second password on a second distributed ledger;
    locking access to the first password on the first distributed ledger to any entity that is not authenticated as the account holder;
    locking access to the second password on the second distributed ledger to any entity that is not authenticated as the designated entity;
    automatically updating the first password periodically and storing the updated first password as a new entry on the first distributed ledger;
    automatically updating the second password periodically and storing the updated second password as a new entry on the second distributed ledger;
    when a document from a predetermined list of documents is digitally scanned and authenticated, unlocking exclusive access to the first password on the first distributed ledger for the designated entity;
    when a second document from a second predetermined list of documents is digitally scanned and authenticated, exclusive access to the second password on the second distributed ledger is unlocked for the designated entity;
    wherein the first and second passwords are reunited as a digital key to unlock the digital vault;
    when the digital vault is unlocked with the first and the second passwords, executing the digital content as the digital key via a machine learning (ML) engine;
    wherein the digital content comprises an estate plan; and
    wherein the estate plan comprises a change of authority for a social media account.

10. The method of claim 9 further configured to generate a single combined password and bifurcate the combined password to generate the first and the second password.

11. The method of claim 9 wherein the digital content is a smart contract.

12. The method of claim 9 wherein the designated entity is:
- a trustee of the account holder;
- an entity with power of attorney from the account holder; or
- an heir to the account holder.

13. The method of claim 9 wherein the predetermined list of documents comprises:
- documents that indicate death of the account holder, and one document of the predetermined list of documents is a death certificate; and
- a document that records approval of the account holder to unlock access to the first password on the first distributed ledger for the designated entity.

14. A blockchain-based dual-password encryption system for a smart contract, the system comprising:
- a first blockchain storing a first password, wherein the first blockchain is access restricted and an account holder is granted access;
- a second blockchain storing a second password, wherein the second blockchain is access restricted and a designated entity is granted access; and
- a third blockchain storing the smart contract, wherein the third blockchain is access restricted and access is only granted upon digital entry of the both the first password and the second password;

wherein:
- the first password is automatically updated periodically and the updated first password is stored as a new entry on the first distributed ledger;
- the second password is automatically updated periodically and the updated second password is stored as a new entry on the second distributed ledger;
- when a document from a predetermined list of documents is digitally scanned and authenticated, exclusive access to the first password on the first distributed ledger is unlocked for the designated entity;
- when a second document from a second predetermined list of documents is digitally scanned and authenticated, exclusive access to the second password on the second distributed ledger is unlocked for the designated entity;
- wherein the first and second passwords are reunited as a digital key to unlock the digital vault;
- when the digital vault is unlocked with the first and the second passwords, the smart contract self-executes as the digital key via a machine learning (ML) engine;
- wherein the digital content comprises an estate plan; and
- wherein the estate plan comprises a change of authority for a social media account.

* * * * *